United States Patent
Barnes

(10) Patent No.: US 7,287,723 B2
(45) Date of Patent: Oct. 30, 2007

(54) TETHERED OR FREE FLIGHT BLIMP WITH COLLAPSIBLE TAIL FINS

(76) Inventor: Tracy L. Barnes, 156 Barnesairship Dr., Statesville, NC (US) 28625

( * ) Notice: Subject to any disclaimer, the term of this patent is extended or adjusted under 35 U.S.C. 154(b) by 160 days.

(21) Appl. No.: 11/181,272

(22) Filed: Jul. 14, 2005

(65) Prior Publication Data

US 2007/0012819 A1    Jan. 18, 2007

(51) Int. Cl.
*B64B 1/42* (2006.01)
(52) U.S. Cl. ............................. 244/31; 244/30
(58) Field of Classification Search ................. 244/24, 244/25, 29–31, 33, 96, 114 R, 115, 125–127; 446/220–226
See application file for complete search history.

(56) References Cited

U.S. PATENT DOCUMENTS

| 1,718,508 | A | * | 6/1929 | White ..................... 446/225 |
| 2,681,774 | A | * | 6/1954 | Winzen et al. ................ 244/31 |
| 2,707,603 | A | * | 5/1955 | Moore, Jr. .................... 244/87 |
| 3,064,926 | A | | 11/1962 | Jalbert |
| 3,119,579 | A | | 1/1964 | Borgeson et al. |
| 3,225,488 | A | | 12/1965 | Goldfarb |
| 3,267,604 | A | * | 8/1966 | Goldsmith .................... 446/222 |
| 3,746,282 | A | * | 7/1973 | Vorachek ..................... 244/31 |
| 3,871,603 | A | * | 3/1975 | Menke et al. ................ 244/125 |
| 3,993,269 | A | * | 11/1976 | Crosby, Jr. .................... 244/33 |
| 4,046,337 | A | * | 9/1977 | Parsons ........................ 244/96 |
| 4,125,233 | A | | 11/1978 | Winker et al. |
| 4,655,154 | A | * | 4/1987 | Leonard ....................... 114/91 |
| 4,718,370 | A | * | 1/1988 | Portell-Vila .................. 114/91 |
| 4,752,271 | A | * | 6/1988 | Reilly et al. ................ 446/225 |
| 5,080,302 | A | * | 1/1992 | Hoke ........................... 244/31 |
| 5,147,429 | A | * | 9/1992 | Bartholomew et al. ....... 55/356 |
| 5,429,325 | A | | 7/1995 | Hunt |
| 5,757,157 | A | | 5/1998 | Falk et al. |
| 5,882,240 | A | | 3/1999 | Larsen |
| 6,019,312 | A | * | 2/2000 | Blenn ........................... 244/51 |
| 6,302,759 | B1 | * | 10/2001 | Hsieh .......................... 446/220 |
| 6,592,076 | B1 | * | 7/2003 | Barnes, III .................. 244/125 |
| 6,739,549 | B2 | * | 5/2004 | Senepart ....................... 244/24 |
| 6,990,916 | B1 | * | 1/2006 | Atwood, Jr. .................. 114/91 |
| 2006/0266886 | A1 | * | 11/2006 | Nachbar ..................... 244/125 |

FOREIGN PATENT DOCUMENTS

GB          534247 A       3/1941
WO      WO 200066424 A1 *  11/2000

* cited by examiner

*Primary Examiner*—Tien Q. Dinh
*Assistant Examiner*—Joseph W Sanderson
(74) *Attorney, Agent, or Firm*—Alston & Bird LLP

(57) ABSTRACT

A lighter than air blimp which has either an aerodynamically shaped or a round envelope of flexible sheet material, and a plurality of stabilizing fins mounted in a circumferentially spaced apart arrangement about the tail end portion of the envelope. The tail fins are collapsible, to faciliate storage and transport to the point of use, and to also facilitate the rapid assembly and deployment of the blimp at the point of use, particularly under windy conditions. Also, the configuration of the fins may be adjusted during flight by a control system which permits adjustment of the orientation of the blimp with respect to the wind direction.

19 Claims, 4 Drawing Sheets

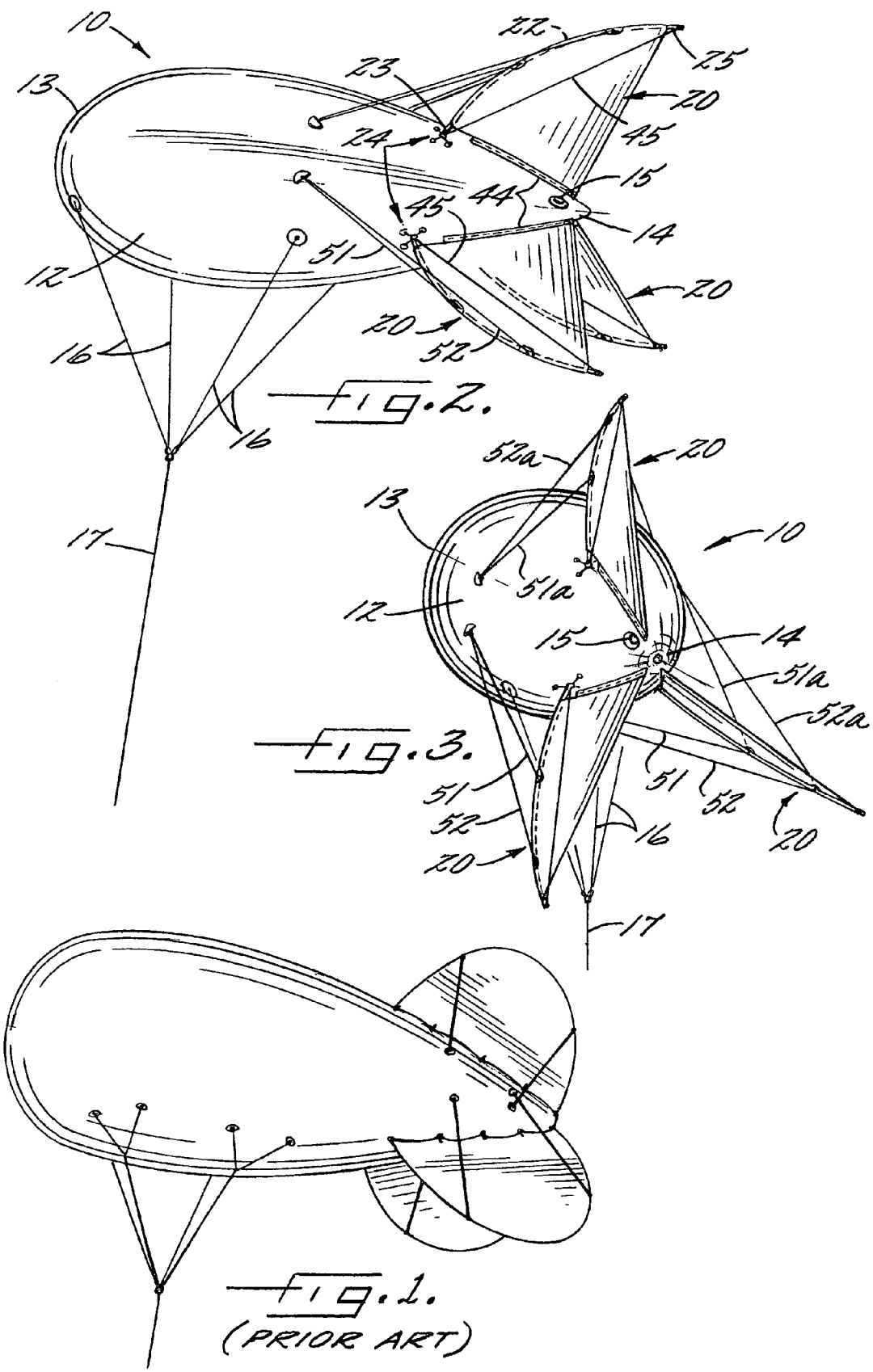

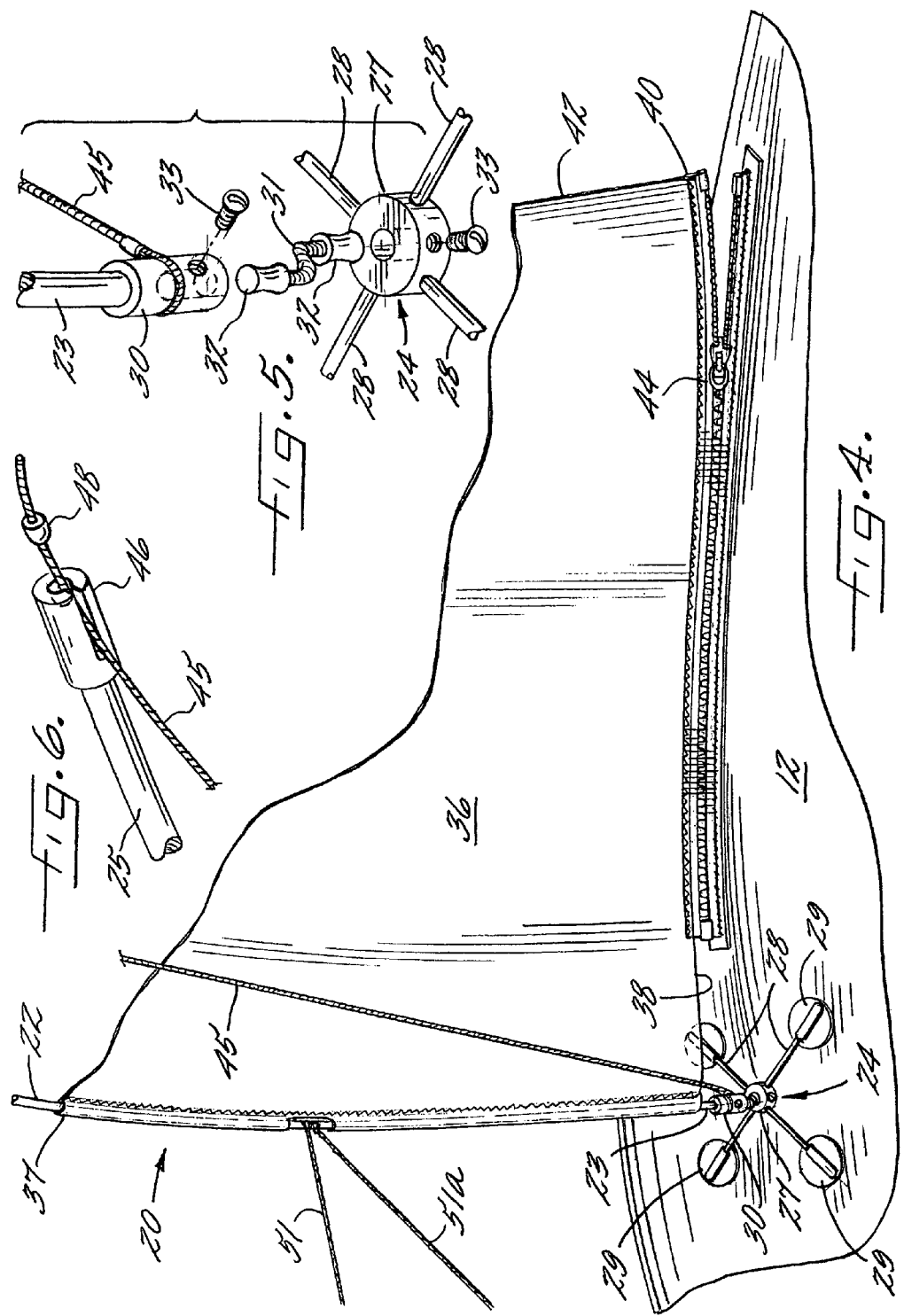

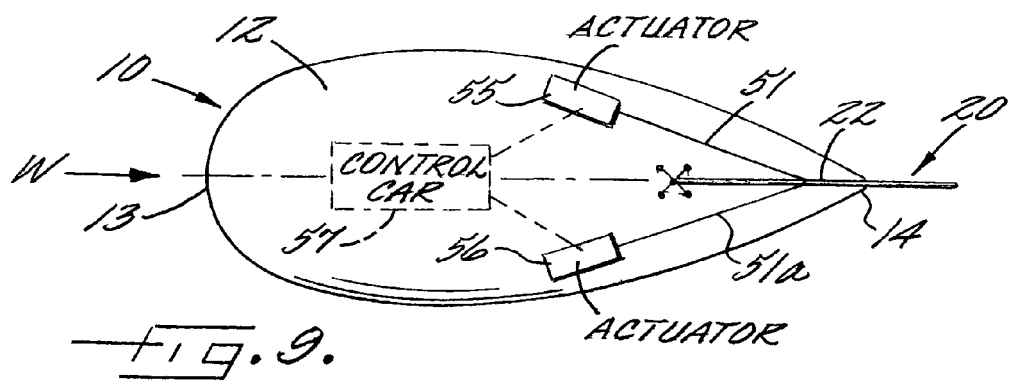
Fig. 9.
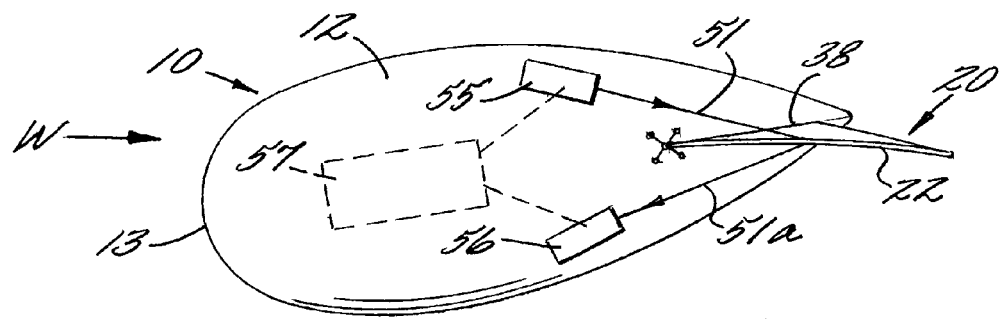
Fig. 10.
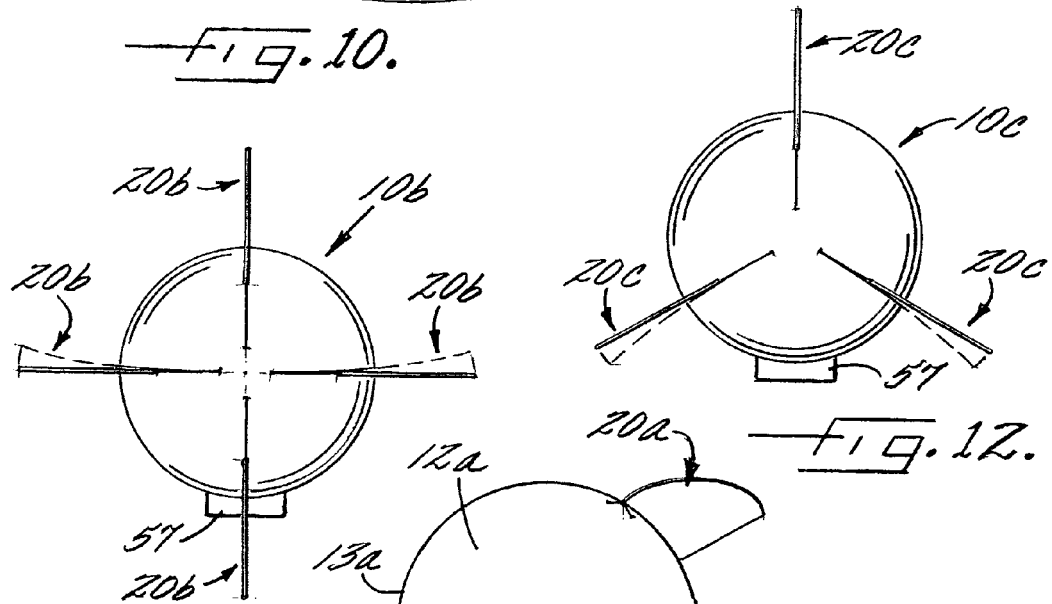
Fig. 11.
Fig. 12.
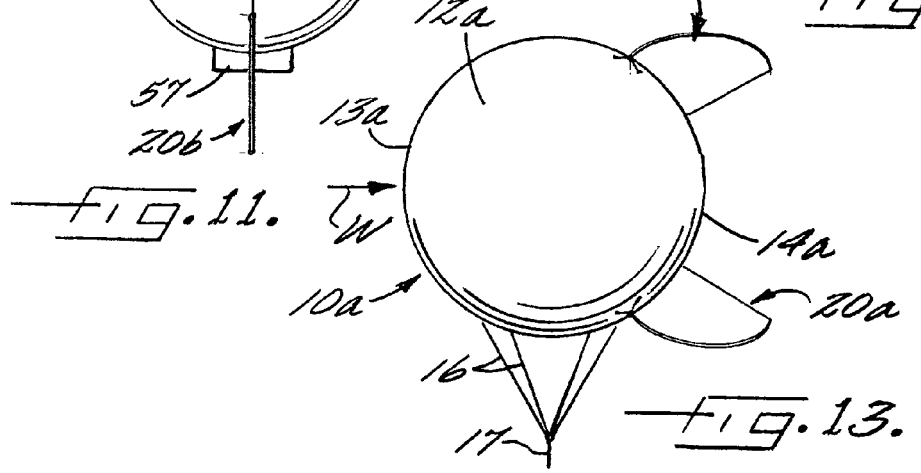
Fig. 13.

TETHERED OR FREE FLIGHT BLIMP WITH COLLAPSIBLE TAIL FINS

BACKGROUND OF THE INVENTION

The present invention is directed to a lighter than air blimp, which may be secured to the ground with a tether or designed for free flight. Such blimps are commonly used for advertising, or for supporting a payload, such as a surveillance camera, at an elevated location.

As illustrated in FIG. 1, known blimps of the described type comprise a teardrop shaped envelope of flexible sheet material and which is filled with a lighter than air gas, such as helium. The envelope is typically 7 to 30 feet in length, although shorter and longer lengths, up to 100 feet or more, are known. Also, the envelope mounts several tail fins to keep the envelope oriented and stable in the wind. The tail fins may be rigid and composed of a structural framework of metal or wood which is covered with a suitable flexible fabric. In the known blimp illustrated in FIG. 1, the tail fins are of generally semi-circular outline, and a pair of guy lines or rods extend laterally from each side so as to support the fin in an upright orientation. Also, the lower edge of each fin is joined to the envelope at a plurality of spaced apart locations. In other known blimps, the lower edge of each fin is continuously sealed along its length to the envelope, and in other cases, the lower edge is not directly joined to the envelope.

As will be apparent, the size or area of the tail fins is important in providing the desired stability in the wind, and it is generally true that the greater the area of the fins the better the stability. However, the size has heretofore been limited by the need to be able to transport and store the blimp in a relatively small space. Also, blimps with relatively large tail fins are vulnerable to wind damage when the blimp is assembled in the field. In this regard, it is conventional practice to transport the blimp in an uninflated and flattened condition on a flat bed trailer to the assembly site, with the tail fins being unattached and lying flat on the trailer. Upon reaching the assembly site, an upright mast is connected at the front of the trailer, and the nose of the envelope is connected to the mast. The envelope is then at least partially inflated with the gas, and the tail fins are assembled to the inflated envelope.

As will be apparent, at this point in the assembly process, the envelope and fins are very vulnerable to damage, since the wind can whip the blimp around its attachment point on the mast.

As a result, several persons are required to hold and inflate the envelope, and then attach the fins, and these operations are particularly difficult in the case of relatively large blimps and when assembly is performed under windy conditions.

It has also been common to construct the fins so as to be fixed to the envelope with the fins being inflatable. This design avoids some of the assembly problems at the point of use, but the inflatable fins are heavy and expensive. Also, they require a relatively high internal pressure in order to provide the needed rigidity, and they thus tend to leak.

It is accordingly an object of the present invention to provide a blimp of the described type which avoids or alleviates the above noted disadvantages of the prior designs.

It is a more specific object of the present invention to provide a blimp which has either an aerodynamic or a round configuration, and which has fins of relatively large area and which can be transported to the point of use in a small package and quickly and easily assembled and deployed at the point of use by a small number of persons even under windy conditions.

It is also a more specific object of the present invention to provide a blimp which has collapsible tail fins which permit the blimp to be easily transported and quickly assembled and deployed at the point of use.

It is a further object of the invention to provide a blimp which incorporates an easily operable control system whereby the orientation of the blimp with respect to the wind direction can be controlled in flight.

SUMMARY OF THE INVENTION

The above and other objects and advantages of the present invention are achieved by the provision of a lighter than air blimp which comprises an envelope of flexible sheet material and which has a nose end and an opposite tail end, and so as to define a longitudinal direction therebetween. At least one relatively flat stabilizing fin is mounted adjacent the tail end of the envelope, and most commonly, a plurality of said fins are mounted in a circumferentially spaced apart arrangement about the tail end of the envelope, with each of the fins comprising a support rod having a foot end joined to the envelope and a second or upper end radially spaced from the envelope. Each fin also includes a panel of flexible sheet material which has a leading edge joined along the length of the flexible rod. The panel further has a second edge extending along the envelope in a direction generally parallel to the longitudinal direction from the point at which the rod is joined to the envelope to a rearward corner. Also, a trailing edge of the panel extends from a point adjacent the second end of the rod to the rearward corner, and the second edge of the panel is joined to the envelope at least at a location adjacent the rearward corner of the panel.

The foot end of the support rod of each tail fin is pivotally joined to the envelope so as to permit movement between an operative position wherein the rod extends generally radially with respect to the longitudinal direction, and a collapsed position wherein the rod extends along the envelope and generally parallel to the longitudinal direction. Thus the blimp may be transported to the point of use with the envelope deflated and with the fins assembled to the envelope in the collapsed configuration. Alternatively, the deflated envelope and the tail fins may be transported to the point of use as separate components and assembled at the point of use.

The support rod of each tail fin is preferably flexible and arcuately curved about a center point which is located toward the tail end of the envelope, and the second end of the support rod, and thus the upper end portion of the panel, may be located longitudinally behind the tail end of the envelope so as to provide good leverage which contributes to the stability of the blimp under windy conditions.

To assemble the fins to the envelope either before or after transport to the point of use, the foot end of the support rod of each fin is joined by a flexible connection to a socket which is fixed to the envelope and which defines a socket axis which is generally perpendicular to the longitudinal direction when the envelope is inflated. The flexible connection permits the rod to be pivotable at a location adjacent the socket about an axis which is transverse to the socket axis and so as to permit the rod to be pivotable between the collapsed and operative positions as described above.

The second edge of the panel of each of the tail fins is preferably joined to the envelope along the full length of the second edge and along a direction extending from the socket toward the tail end of the envelope.

In one embodiment, the support rod extends rearwardly from its mounting socket in the collapsed configuration, and in a second embodiment, the support rod extends forwardly from the socket. In the first embodiment, the second edge of the panel is preferably joined to the envelope while the envelope remains deflated, and in the second embodiment, the second edge of the panel is joined to the envelope after inflation of the envelope and after the support rod is lifted to its operative position.

The blimp of the present invention may also incorporate a control system which permits the orientation of the blimp with respect to the wind direction to be controlled during flight. This control system utilizes a pair of guy lines which are connected between the envelope and at least one of the fins, with the guy lines being connected to the fin at a point along the length of the support rod. Also, the guy lines are disposed in a V-shaped orientation when viewed in plan, and the control system includes actuators for drawing in a selected one of the guy lines while letting out the other of the guy lines. This causes the associated fin to warp in a manner analogous to "wing warpage" utilized in early aircraft. The warpage of the fin causes the tail end to move in a first direction and the nose end of the envelope to move in the opposite direction.

BRIEF DESCRIPTION OF THE SEVERAL VIEWS OF THE DRAWINGS

Figure 7:
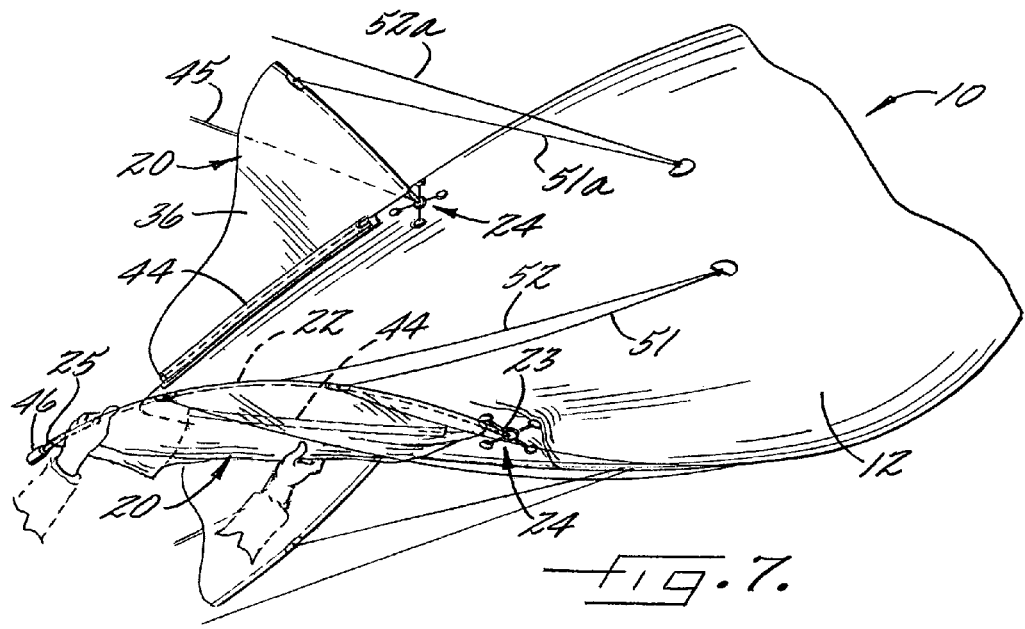
Figure 8:
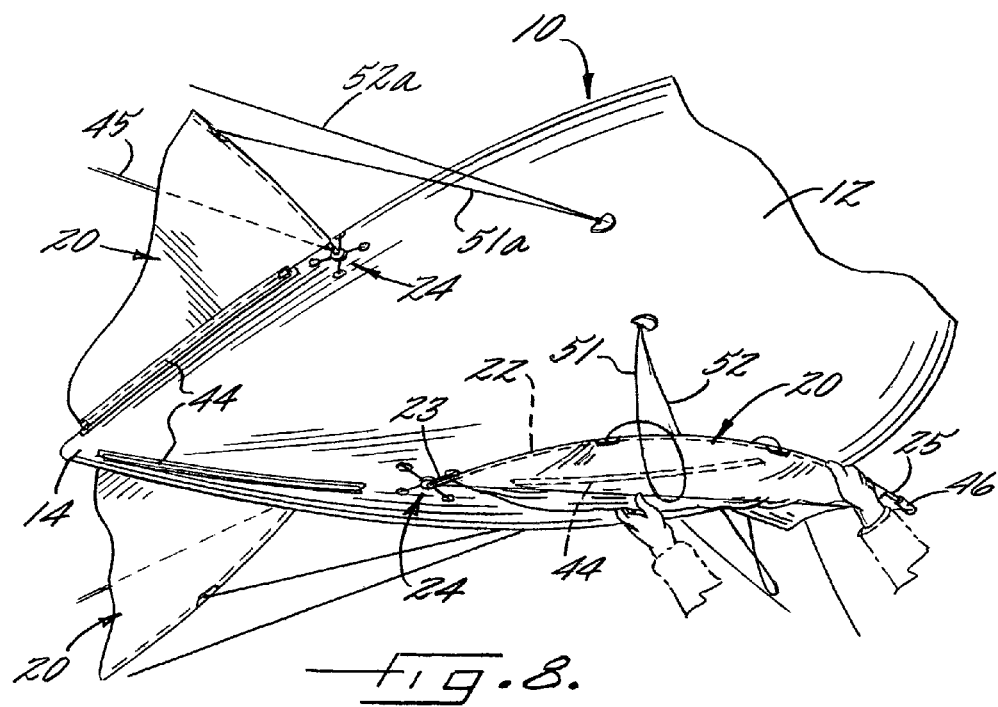

Having thus described the invention in general terms, reference will now be made to the accompanying drawings, which are not necessarily drawn to scale, and wherein:

FIG. 1 is a perspective view of a prior art blimp of the described type;

FIG. 2 is a perspective view of a blimp which embodies the present invention;

FIG. 3 is a second perspective view of the blimp of FIG. 2, looking generally at the rear end of the blimp;

FIG. 4 is an enlarged fragmentary perspective view showing the structure for attaching a tail fin to the envelope of the blimp;

FIG. 5 is a fragmentary perspective view showing the structure for attaching the foot end of the support rod of a tail fin to its socket;

FIG. 6 is a fragmentary perspective view of the upper end of a support rod and its supporting chord line;

FIG. 7 is a fragmentary view of the rear end portion of the blimp of FIG. 2, with one of the tail fins collapsed in a rearward direction;

FIG. 8 is a view similar to FIG. 7 and showing one of the tail fins collapsed in a forward direction;

FIG. 9 is a schematic top plan view of a blimp having provision for adjusting the position of one of the tail fins to thereby control the orientation of the blimp with respect to the wind direction;

FIG. 10 is a view similar to FIG. 9 and showing the fin in a warped configuration which causes the blimp to pivot with respect to the wind direction;

FIG. 11 is an end view of the blimp having four tail fins disposed in the configuration of a cross, with each fin being controllable as shown in FIGS. 9 and 10;

FIG. 12 is a view similar to FIG. 11 but showing a blimp with three controllable fins; and FIG. 13 is a side elevation view of a round blimp having two collapsible fins according to the present invention.

DETAILED DESCRIPTION OF THE INVENTION

The present inventions now will be described more fully hereinafter with reference to the accompanying drawings, in which several, but not all embodiments of the inventions are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Referring more particularly to the drawings, FIGS. 2 and 3 illustrate a lighter than air aerodynamic blimp 10 which embodies the present invention and which comprises an elongate tubular aerodynamically shaped envelope 12 of flexible sheet material, such as polyurethane film. The envelope 12 defines a forward or nose end 13 and an opposite tail end 14, and so as to define a longitudinal direction therebetween.

The envelope 12 incorporates a conventional valve 15 adjacent the tail end for admitting a suitable gas such as helium into the interior of the envelope. Also, a bridle 16 is attached to the exterior of the blimp, which is in turn connected to a tether line 17 which connects the envelope to the ground. As is conventional, the bridle and tether line are configured to support the envelope at a desired orientation with respect to the horizontal and so that the nose end 13 of the envelope is slightly lifted into the prevailing wind.

The rearward end portion of the envelope converges in the manner of a cone toward the tail end 14, and a total of three tail fins 20 are mounted to the envelope 12 in a circumferentially spaced apart arrangement about the tail end of the envelope. While three tail fins 20 are illustrated in the embodiment of FIGS. 2 and 3, it will be understood that a different number may be employed. For example, four fins may be employed, in either an x-shaped arrangement in end view or a cross-shaped arrangement in end view.

Each of the tail fins 20 is of generally flat configuration, and each includes a support rod 22 which has a foot end 23 joined to the envelope by means of a flexible connection 24, and a second or upper end 25 radially spaced from the envelope. The rod 22 is resiliently flexible, and it may be fabricated from metal or a suitable reinforced plastic.

The flexible connection 24 for mounting the foot end 23 of the rod to the envelope 12 is best seen in FIGS. 4 and 5, and it comprises a socket 27 which is fixed to the envelope 12 so as to define an upright axis. The socket 27 is fixed to the envelope by means of four radially extending support legs 28, which are in turn fixed to the outer surface of the material of the envelope by adhesive patches 29. As will become apparent, the internal gas pressure within the envelope 12 acts through the flexible connection 24 to push the rod 22 up at all times with a cushioned biasing force. More particularly, whenever the rod 22 is pushed into the envelope, the internal gas pressure will tend to restore the envelope to its original or natural shape. This feature is particularly helpful during the assembly procedure as further described below.

The foot end 23 of the support rod 22 mounts a tubular socket 30, and a flexible link 31 has a pin 32 at each end for being received in respective ones of the sockets 27, 30. A radial set screw 33 is provided in each of the sockets for releasably securing the associated pin. The flexible connection thus permits the support rod 22 to be pivoted in any direction from the vertical.

Each fin 20 further comprises a panel 36 of flexible sheet material, such as rip stop nylon. Each panel defines a leading edge 37 which forms a pocket which receives the support rod 22. A second edge 38 of the panel extends along the envelope in a direction generally parallel to the longitudinal direction from the foot end 23 of the rod 22 to a rearward corner 40. The panel also defines a trailing edge 42 extending from the second end 25 of the rod to the rearward corner 40.

The second edge 38 of the panel is joined to the envelope 12 at least at a location adjacent the rearward corner 40, and in the illustrated embodiment, the second edge 38 is joined to the envelope by means of a releasable closure which extends along substantially the entire length of the second edge. A closeable zipper 44 is preferred for this closure, but other closures such as cooperating Velcro® strips may be employed.

Preferably, and as best seen in FIG. 2, the flexible support rod 22 is arcuately curved about a center point which is located adjacent or beyond the tail end of the envelope 12. To support the rod in this arcuate configuration against its natural resilience tending to return the rod to its straight configuration, a chord line 45 is secured between the ends of the rod. The chord line 45 may be composed of wire or other thread material of relatively high tensile strength, and it may be releasably secured to at least one of the rod ends to facilitate the transport of the deflated blimp as further described below.

FIGS. 5 and 6 illustrate a preferred embodiment of the structure for releasably joining the chord line 45 to the ends of the rod 22. In particular, and as seen in FIG. 5, a loop may be formed in one end of the chord line 45 which fits within an annular groove in the socket 30. The second or upper end 25 of the rod 22 includes a post 46 which has an inclined axial slot which receives the opposite end of the chord line 45, and the opposite end mounts a stop 48 for engaging the end of the post 46, to thereby hold the rod in its flexed condition.

It is also possible to utilize a straight rod as opposed to an arcuately curved rod, but it has been found that the use of an arcuately curved rod provides a desirable tension in the fabric of the panel 36, particularly along the second edge 38. Also, it is believed that a curved rod provides increased rigidity along its length, and so that there is less flex at the upper end 25.

While the rod 22 is described above as being flexible and resilient, and held in an arcuate configuration by a chord line 45, it will be understood that the rod could be molded or otherwise permanently shaped with the desired curvature. Also, the rod does not necessarily need to assume the shape of a true arc, and it could include a bend along its length so that its outer end portion extends, for example, generally parallel to the longitudinal direction.

To complete the assembly of the tail fins 20 to the envelope 12, each fin of the disclosed embodiment is supported by a total of four guy lines. A first pair of guy lines 51, 51a extend from about the midpoint along the length of the support rod 22 to the envelope in a V-shaped orientation when viewed in plan, note FIGS. 3 and 9. The second pair of guy lines 52, 52a are similarly oriented and attached to the support rod 22 between its midpoint and the second or upper end 25. This number and orientation of the guy lines has been found to be efficient and effective in holding the fins, but other numbers and orientations are no doubt possible with acceptable results.

The guys lines 51, 51a, 52, and 52a preferably are composed of a flexible wire or cord of metal or a plastic which has a high tensile strength. However, it is possible to utilize solid rods or struts for the guy lines.

An important benefit and advantage of the fins 20 as described above is that they are relatively lightweight and thus may be manufactured with a large area while being easily handled and assembled by a small number of persons. Also, the illustrated configuration permits a significant area of each fin to be located longitudinally behind the tail end 14 of the envelope. This latter feature provides significant leverage which acts to quickly spin the blimp into the wind during its ascension. It also provides significantly improved stability while it is airborne.

The embodiments of the invention illustrated in FIGS. 2-6 have an envelope 12 which is of an elongate tubular aerodynamically shaped or teardrop configuration. However, and as illustrated in FIG. 13, the collapsible fins 20 of the present invention may be employed on a blimp 10a which has a round, gas filled envelope 12a. More particularly, the round envelope defines a nose end 13a and a tail end 14a, and two stabilizing fins 20 as described above are mounted adjacent the tail end of the envelope. The fins are thus positioned to laterally orient the envelope so that its nose end 13a faces into the wind W. Also, the envelope can be attached to a bridle 15 and tether line 17 in a conventional manner.

In the case of a round envelope, horizontal fins would normally not be necessary, since there is no need to pitch the nose up or down. Also, while two vertical fins are illustrated in FIG. 13, the use of only one vertical fin is often sufficient on a round envelope.

The Assembly Process at the Point of Use

In the following description, the blimp 10 is referred to, but it will be understood that the description would also apply to the blimp 10a as seen in FIG. 13.

The blimp 10 is preferably transported to the point of use with the envelope 12 deflated and collapsed into a small package, and with the fins 20 unattached to the envelope. Each unattached fin may be initially in a configuration with the chord 45 unattached to the ends of the rod, so that the rod is straight, to thereby further minimize the volume of the fins during transport.

To effect assembly, the rod 22 of each fin 20 is deflected and held in its arcuate configuration by the chord line 45, and the fins 20 are then attached to the uninflated envelope by joining the foot end 23 of the rod to the mounting socket 27, using the flexible link 31. In a first embodiment, the support rods 22 of the fins are disposed to extend rearwardly from the socket 27 toward the tail end 14 of the envelope, in which case the second or lower edge 38 of the panel of each fin may then be secured to the envelope by closing the zipper 44. Finally, the two pairs of guy lines 51, 51a, 52, 52a are attached, and the envelope is then inflated, with the fins initially remaining in the rearwardly collapsed position, note the hand held fin as seen in FIG. 7.

The fins 20 will remain in the rearward position during the inflation of the envelope. However, upon manually pushing the rod 22 of each fin up so that the fins move upwardly over a dead center position, the fins will snap upwardly into their operative position, with all of the guy lines then being taut. During this elevation of the fins, the foot end 23 of the rod of each fin will push the socket 27 of the connection 24 downwardly into the relatively flexible envelope, and the resilience of the envelope will permit the rod to pivot upwardly and then cause it to snap upwardly to its operative position in the manner described above. The blimp is then ready to have its payload attached (if any) and be released so as to rise to an elevated location where it is held by its bridle 16 and tether line 17.

As an alternative to the above described assembly process, the uninflated envelope 12 may be stored and transported with the lower ends 23 of the rods of the fins attached to the socket 27 of the flexible connection 24, but with the zippers 44 released. The fins may be pivoted forwardly with respect to the uninflated envelope, and temporarily held against the envelope by a surrounding strap or the like (not shown). Also, the guy lines 51, 51a, 52, 52a may be attached and will remain slack. When in this condition, the rear end portion 14 of the envelope 12, which is quite flexible, may be folded toward the nose end so as to reduce the longitudinal length of the envelope, which facilitates transport and storage.

When ready for final assembly at the point of use, the strap is released, and the envelope is inflated. Next, the fins 20 are released so as to move from the hand held collapsed position as seen in FIG. 8 to their operative positions as also seen in FIG. 8. The guy lines then becoming taut, and the zippers 44 are closed. The blimp is then ready to be released to permit it to ascend and be held by the tether line 17.

It will be seen that the required assembly steps in either embodiment are relatively straightforward, and they may be accomplished quickly and without difficulty even under windy conditions. Also, only a small number of persons is required for the assembly, since the fins 20 are lightweight and easily attached to the envelope at the point of use, even under windy conditions. This advantage is particularly important in the case of large blimps, which may be 30 to 50 feet or longer in length, and which are designed to carry heavy payloads.

The Orientation Control System

FIGS. 9-12 of the drawings schematically illustrate a control system for the blimp of the present invention, which permits the orientation of the blimp with respect to the wind direction W to be controlled during flight. The control system is associated with a pair of guy lines 51, 51a which are connected between the envelope and at least one of the fins 20. As best seen in FIGS. 9 and 10, the guy lines 51, 51a are disposed in a V-shaped orientation when viewed in plan. Also, one end of each guy line is attached to the support rod 22 of the fin at a common point along the length of the rod.

The guy line 51 incorporates an actuator 55, and the guy line 51a incorporates an actuator 56. The actuators selectively permit the associated guy line to be either drawn in, or let out. The two actuators 55, 56 are connected to a control car 57, which in the case of an unmanned blimp, may contain a conventional radio receiver for operating the actuators. In the case of a manned blimp, the operator is seated in the control car 57 and operates the actuators 55, 56 by mechanical or electrical lines.

FIG. 9 illustrates the actuators 55, 56 configured to support the fin in a neutral position. However, should it be decided to drop the nose end 13 of the blimp with respect to the wind direction W, a signal from the control car 57 operates the actuator 56 to draw in the guy line 51a, and the signal concurrently operates the actuator 55 to let out the guy line 51. This causes the upper portion of the support rod 22 to be pulled down as seen in FIG. 10, with the lower edge 38 of the panel remaining secured to the envelope along its length. This downward tilt of the fin causes the fin to be biased upwardly by the wind, which in turn lowers the nose end 13.

It is also possible to configure the control system so as to "warp" the fins as opposed to imparting a pure tilting movement. For this result, two pairs of guy lines would be attached to the fin in the manner described above, with the actuators being connected to the upper pair of guy lines. Thus when the upper guy lines are moved, the lower pair of lines tend to retain the lower portion of the fin in its original or natural position, while the upper portion is "warped" in the desired direction.

FIG. 11 is an end view of a blimp 10b having four fins 20b in the orientation of a cross. With this configuration, the two horizontal fins can be operated in the manner of the elevator of an aircraft. The neutral position of the two horizontal fins is shown in solid lines, and when the two fins are tilted into the elevated position as shown in dashed lines, the tail end will be pushed down to elevate the nose end of the blimp. Similarly, when the horizontal fins are tilted downwardly, the tail end will be lifted and the nose end will be dropped.

The two vertical fins 20b as seen in FIG. 11 operate in a similar fashion, and function in the manner of a rudder of an aircraft to turn the blimp left or right.

FIG. 12 is an end view of a blimp 10c having three tail fins 20c. To drop the nose end of the blimp, the two lower fins are tilted in a downward direction to the position shown in dashed lines, which causes the tail end to lift. The nose end of the blimp may be raised by tilting the two lower fins in the upward direction. To turn the blimp on its vertical axis, the vertical fin is tilted in either direction.

Many modifications and other embodiments of the invention set forth herein will come to mind to one skilled in the art to which the invention pertains having the benefit of the teachings presented in the foregoing description and the associated drawings. For example, while the embodiment of the invention as illustrated in FIGS. 2-7 relates to a tethered blimp, it will be appreciated that the novel features of the invention are also applicable to a blimp designed for free flight. Such free flight blimps typically have a control car mounted centrally along the lower edge of the envelope, which may include a radio controlled propulsion system. In larger blimps, the control car may be large enough to house an operator. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A lighter than air blimp, comprising
an envelope of flexible sheet material and having a nose end and an opposite tail end, and so as to define a longitudinal direction therebetween,
at least one relatively flat stabilizing fin mounted adjacent the tail end of the envelope, with said at least one fin comprising
(a) a support rod having a foot end joined to the envelope and a second end radially spaced from the envelope, and
(b) a panel of flexible sheet material having a leading edge joined along the length of the support rod, a second edge extending along the envelope in a direction generally parallel to said longitudinal direction from the point at which the foot end of the rod is joined to the envelope to a rearward corner, and a trailing edge extending from a point adjacent the second end of the rod to the rearward corner, and with the second edge of the panel being joined to the envelope at least at a location adjacent said rearward corner, and wherein the foot end of the support rod of said at least one fin is pivotally joined to the envelope so as to permit movement between an operative position wherein the rod extends generally radially with respect to the longitudinal direction, and a collapsed position wherein the rod extends along the envelope and generally parallel to the longitudinal direction.

2. The blimp as defined in claim 1 wherein the trailing edge of the panel of flexible sheet material is unsupported so as to facilitate the pivoting of the leading edge and the support rod between the operative and collapsed positions.

3. The blimp as defined in claim 2 wherein the support rod of said at least one fin is flexible and resiliently curved into an arcuate configuration about a center point which is located on the side of the support rod toward the tail end of the envelope.

4. The blimp as defined in claim 3 wherein said at least one fin further comprises a chord line extending directly between the foot end of the support rod and the opposite second end of the support rod for holding the rod in said arcuate configuration.

5. The blimp as defined in claim 2 wherein the second end of the support rod of said at least one fin and an adjacent portion of the panel are located longitudinally behind the tail end of the envelope.

6. The blimp as defined in claim 2 wherein the envelope has an elongate, tubular, aerodynamically shaped configuration.

7. The blimp as defined in claim 2 wherein the second edge of the panel of said at least one fin is releasably joined to the envelope adjacent said rearward corner.

8. The blimp as defined in claim 7 wherein in the collapsed position the support rod of said at least one fin extends rearwardly from the point at which the foot end of the rod is joined to the envelope.

9. The blimp as defined in claim 7 wherein in the collapsed position the second edge of the panel of said at least one fin is released from the envelope, and the support rod extends forwardly from the point at which the foot end of the rod is joined to the envelope.

10. The blimp as defined in claim 2 further comprising at least two guy lines disposed at an angle to each other and attached between said at least one fin and the envelope for securing the fin in its operative position.

11. The blimp as defined in claim 2 wherein the second edge of the panel of said at least one fin is joined to the envelope by means of a releasable closure extending along at least substantially the entire length of the second edge.

12. The blimp as defined in claim 11 wherein the releasable closure comprises a zipper.

13. The blimp as defined in claim 2 further comprising at least one tether attached to the envelope for securing the blimp to the ground.

14. The blimp as defined in claim 2 wherein the envelope is filled with a lighter than air gas which is under a pressure sufficient to exert a cushioned, outwardly directed force on the foot end of the support rod when the support rod is pushed into the envelope.

15. The blimp as defined in claim 2 wherein the blimp comprises a plurality of said stabilizing fins, with the fins being mounted in a circumferentially spaced apart arrangement about the tail end of the envelope.

16. A lighter than air blimp having a directional control capability, comprising an envelope of flexible sheet material and having a nose end and an opposite tail end, and so as to define a longitudinal direction therebetween, a plurality of relatively flat stabilizing fins mounted in a circumferentially spaced apart arrangement about the tail end of the envelope, with each of said fins comprising (a) a support rod having a foot end joined to the envelope and a second end radially spaced from the envelope, and (b) a panel of flexible sheet material having a leading edge joined along the length of the support rod, a second edge extending along the envelope in a direction generally parallel to said longitudinal direction from the point at which the foot end of the rod is joined to the envelope to a rearward corner, and a trailing edge extending from a point adjacent the second end of the rod to the rearward corner, and wherein the second edge of the panel is joined to the envelope by means of at least one releasable closure, a pair of guy lines connected between the envelope and at least one of the fins, with the guy lines being connected to the fin at a point along the length of the support rod of the fin, and with the guy lines being disposed in a V-shaped orientation when viewed in plan, and a control system for drawing in a selected one of the guy lines while letting out the other of the guy lines to cause the associated fin to tilt with respect to the longitudinal direction and thereby permit control of the orientation of the blimp with respect to the wind direction.

17. The blimp as defined in claim 16 wherein the foot end of the support rod of each of said fins is pivotally joined to the envelope so as to permit movement between an operative position wherein the rod extends generally radially with respect to the longitudinal direction, and a collapsed position wherein the rod extends along the envelope and generally parallel to the longitudinal direction.

18. The blimp as defined in claim 17 wherein the support rod of each of said fins is flexible and resiliently curved into an arcuate configuration about a center point which is located on the side of the support rod toward the tail end of the envelope.

19. The blimp as defined in claim 16 further comprising a second pair of guy lines connected between the envelope and said at least one of the fins, with the second pair of guy lines being connected to the fin at a point along the length of the support rod which is closer to the envelope than is the point at which the first mentioned pair of guy lines is attached, and with the second pair of guy lines being disposed in a V-shaped orientation when viewed in plan, and wherein operation of the control system causes the fin to warp with respect to the longitudinal direction.

* * * * *